United States Patent [19]
Fernekes et al.

[11] Patent Number: 5,444,479
[45] Date of Patent: Aug. 22, 1995

[54] SINGLE CAMERA AUTOSTEREOSCOPIC IMAGING APPARATUS

[75] Inventors: Leo M. Fernekes, New York; Stefan J. Rublowsky, Brooklyn, both of N.Y.

[73] Assignee: Vision III Imaging, Inc., Herndon, Va.

[21] Appl. No.: 115,101

[22] Filed: Sep. 2, 1993

[51] Int. Cl.[6] .................. H04N 13/00; H04N 5/30
[52] U.S. Cl. ...................... 348/42; 348/51; 348/195; 348/205; 348/373; 348/375
[58] Field of Search ............... 348/42, 43, 49, 51, 348/54, 55, 57, 58, 195, 205, 373, 375; 248/274; H04N 13/00

[56] References Cited

U.S. PATENT DOCUMENTS

| | | | |
|---|---|---|---|
| 1,950,473 | 3/1934 | Brand | 88/16.6 |
| 2,002,090 | 5/1935 | Ives | 88/16.6 |
| 2,158,660 | 5/1939 | Kanolt | 95/36 |
| 2,356,441 | 8/1944 | Bickley | 88/16.6 |
| 2,933,008 | 4/1960 | Barnett | 88/14 |
| 3,608,457 | 9/1971 | Barker | 95/18 |
| 4,006,291 | 2/1977 | Imsand | 358/92 |
| 4,062,045 | 12/1977 | Iwane | 358/88 |
| 4,303,316 | 12/1981 | McElveen | 352/57 |
| 4,420,230 | 12/1983 | McElveen | 352/43 |
| 4,429,328 | 1/1984 | Jones, Jr. et al. | 358/88 |
| 4,476,492 | 10/1984 | Muth | 358/208 |
| 4,528,587 | 7/1985 | Jones, Jr. | 358/92 |
| 4,714,319 | 12/1987 | Zeevi et al. | 350/144 |
| 4,815,819 | 3/1989 | Mayhew et al. | 350/144 |
| 4,905,081 | 2/1990 | Morton | 348/43 |
| 4,966,436 | 10/1990 | Mayhew et al. | 350/143 |
| 5,014,126 | 5/1991 | Prichard et al. | 358/91 |
| 5,081,530 | 1/1992 | Medina | 358/88 |
| 5,157,484 | 10/1992 | Prichard et al. | 358/88 |

FOREIGN PATENT DOCUMENTS

| | | | |
|---|---|---|---|
| 1-107247A | 4/1989 | Japan | G03B 35/24 |
| 2135470 | 8/1984 | United Kingdom | G03B 35/02 |

Primary Examiner—Joseph Mancuso
Assistant Examiner—Bipin H. Shalwala
Attorney, Agent, or Firm—Finnegan, Henderson, Farabow, Garrett & Dunner

[57] ABSTRACT

A support frame is coupled to a counterweight frame to form a mechanical oscillator in which oscillations of adjustable amplitudes are induced to produce parallax, oscillatory scanning motion of a camera rotatable mounted by the support frame. A spring assembly, acting on the support and counterweight frames, establishes an effective spring constant to tune the resonator to a particular resonate frequency. Rotatable motion of the camera relative to the support frame consistently directs the optical axis of the camera to a signal convergence point in the scene being photographed. Separate motors are selectively energized by a control system to regulate the amplitudes of resonator oscillation to a desired disparity setting, to tune the resonator to a desired resonant frequency setting, and to direct the camera to a desired convergence point setting.

29 Claims, 12 Drawing Sheets

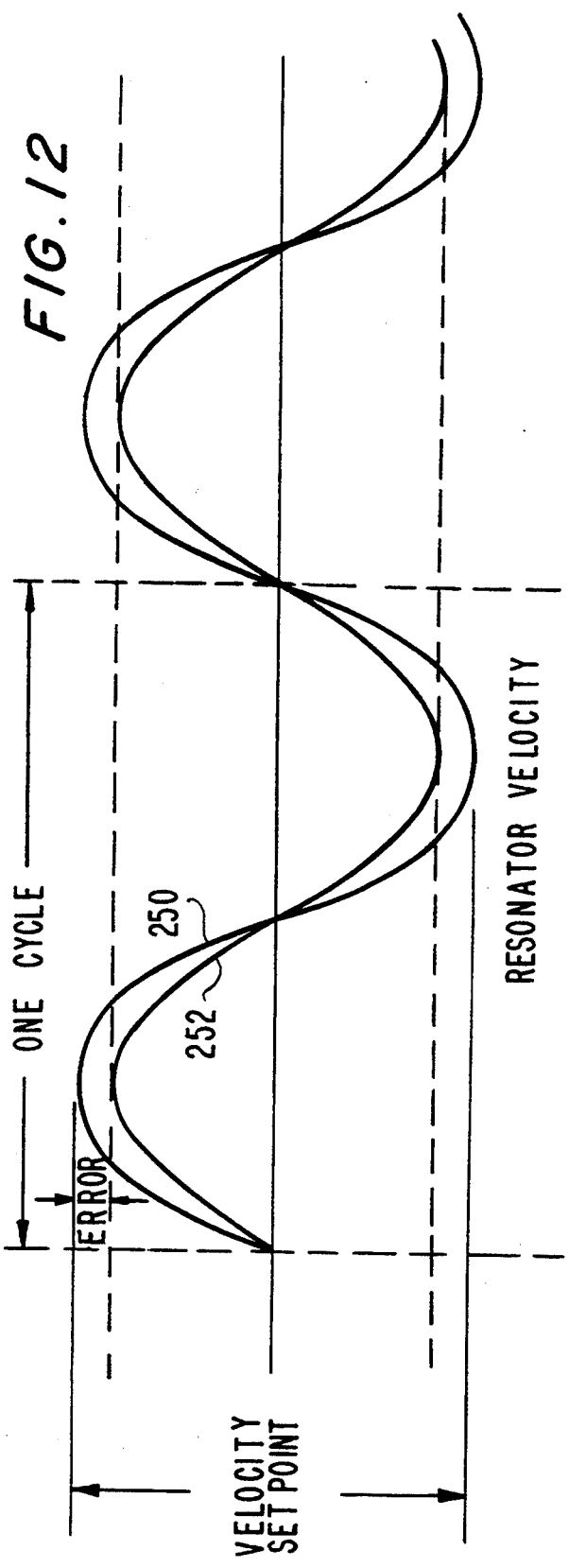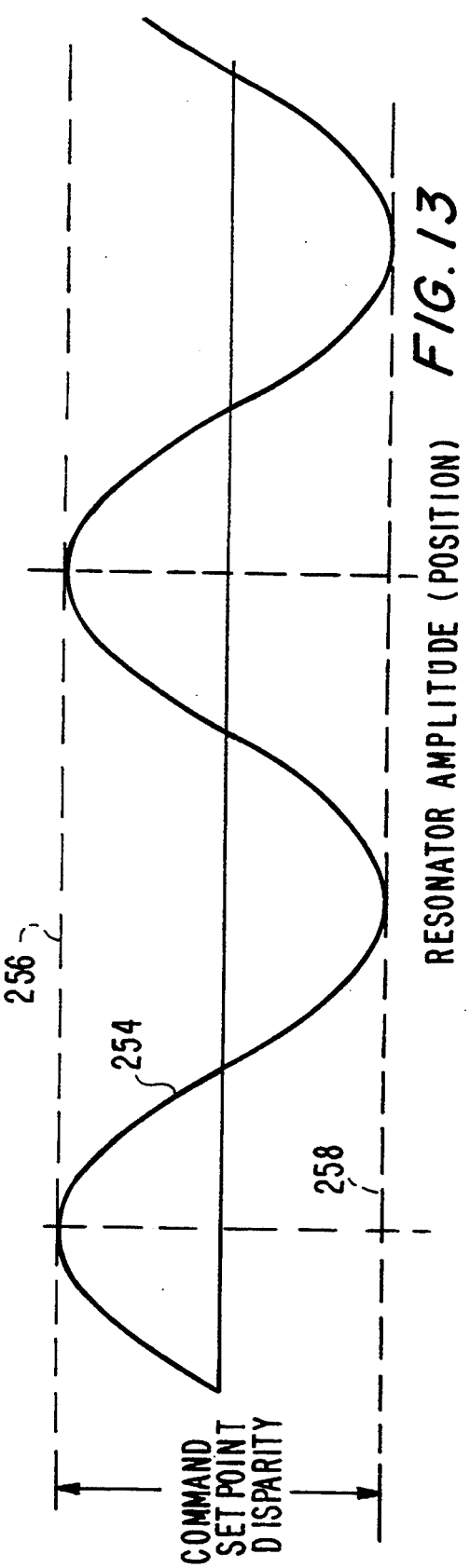

SINGLE CAMERA AUTOSTEREOSCOPIC IMAGING APPARATUS

BACKGROUND OF THE INVENTION

1. Field of the Invention

The present invention relates to apparatus for obtaining images of a scene using a single imaging device, wherein the images can be displayed as a three dimensional illusion of the scene when viewed by an observer having monocular vision.

2. Prior Art

The production of two-dimensional images that can be displayed to provide a three-dimensional illusion has been a long standing goal in the visual arts field. Methods and apparatus for producing such three-dimensional illusions have to some extent paralleled the increased understanding of the physiology of depth perception.

The perception of three-dimensional space depends on various kinds of information (cues) in the scene being viewed, such as relative size, linear perspective, interposition, light and shadow, gradients (monocular cues), as well as retinal-image size, retinal disparity, accommodation, convergence (binocular cues), and familiarity with the subject matter of the scene viewed (learned cues).

The most important binocular cue is parallax, i.e., depth information gain from comparing the images of the scene from each eye. The distance between the center points or irises of the eyes of an average human being, generally referred to as the intraocular distance or disparity, is approximately 65 mm. The fundamental physiological basis for binocular vision is two eyes that look in the same direction and have overlapping visual fields. Each eye views a scene from a slightly different angle and focuses it onto the retina, a concave surface at the back of the eye lined with nerve cells, or neurons. Because the retinal surfaces are two-dimensional, the images focused by the eyes are also two-dimensional. Both two-dimensional images are transmitted along the optic nerves to the brain's visual cortex, where they are combined, through stereopsis, to form a three-dimensional model of the scene. The rate of combination in the brain of the two-dimensional images formed at the retina, generally referred to as the viseo-psychological suppression or memory rate, appears to be approximately 3 to 6 Hz.

Various approaches have been used in the past to obtain and display images having the appearance of depth. One commonly used approach is to obtain images of a scene from two horizontally displaced viewing points of origin. The horizontal displacement of the points of origin is generally equal to or less than the intraocular distance. Images obtained from these two points are simultaneously superimposed on a projection screen, but the light forming these images is polarized differently for the images from the left point of origin than for images from the right point of origin. Accordingly, it is necessary for the observer to wear glasses having appropriately polarized lenses. Because of the necessity of having to wear these special glasses, this stereoscopic approach to displaying images in three-dimensional illusion has never gained wide viewer acceptance.

Consequently, development efforts have concentrated on an autostereoscopic approach to displaying images in three-dimensional illusion, which does not require the viewer to wear special glasses. In this autostereoscopic approach, images from horizontally displaced left and right points of origin are displayed alternatingly rather than simultaneously. An example of this approach is disclosed in U.S. Pat. No. 4,303,316 issued to McElveen. U.S. Pat. No. 4,006,291, issued to Imsand, adopts a form of this approach in which images from one point of origin are primarily used, while images from another point of origin are periodically inserted.

More recently, autostereoscopic approaches using vertical alignment of the viewing points, generally referred to as vertical parallax, have been proposed. An example of a vertical parallax system is disclosed in U.S. Pat. No. 4,429,328, issued to Jones, Jr., et al. Studies have shown that the vertical parallax approach to autostereoscopic imaging produces the appearance of depth, while being more amenable or comfortable to the viewer than the horizontal parallax approach.

The use of separate cameras, one at each of two points of origin, to record images which are then displayed in alternating fashion is disclosed in U.S. Pat. No. 4,966,436 issued to Mayhew and Prichard. While this approach produces images which provide a three-dimensional illusion upon when displayed, precision matching of chrominance and luminance of the two cameras is required. Moreover, considerable operator skill is required to adjust disparity, convergence and time-displacement rates of image recordings in a coordinated manner to maintain a stable image.

To avoid the drawbacks associated with a two camera system, autostereoscopic methods and apparatuses using a single camera/single lens have been developed. U.S. Pat. Nos. 5,014,126 and 5,157,484, also issued to Mayhew and Prichard, disclose single camera autostereoscopic systems capable of recording images which, when displayed, are perceived by a viewer in three-dimension.

SUMMARY OF THE INVENTION

A primary objective of the present invention is to provide an improved autostereoscopic apparatus utilizing a single camera to record images for subsequent display in three-dimensional illusion. To achieve this objective, the apparatus of the present invention includes a support frame and a counterweight frame mounted by a base for respective oscillatory motion. At least an optical element of an imaging device, such as a film camera or a video camera, is mounted by the support frame. Oscillatory motion of the support frame and the counterweight frame is induced in 180° phased relation, whereby the two frames are always moving in opposite directions. Springs acting on the support and counterweight frames establish a mechanical resonant frequency for the oscillatory motion of the frames. The mass of the counterweight frame is made equal to the combined masses of the support frame and the optical element.

In accordance with a feature of the present invention, separate springs act on corresponding one ends of a pair of pivot arms, whose other ends are separately pivotally connected to the support frame and the counterweight frame. The pivot arms rock on lengthwise adjustable fulcrums as the frames oscillate to vary the resonant frequency of their oscillatory motion.

As an additional feature of the invention, the camera is mounted to the support frame for controlled pivotal motion during oscillation of the optical element to continuously direct the camera optical axis toward a single convergence point included in the scene being imaged.

In accordance with another feature of the present invention, a disparity motor is utilized to induce oscillatory motion of the counterweight frame and the optical element/support frame as a mechanical resonator and to maintain oscillation amplitude such as to conform to a parallax or disparity setting. In addition, a tuning motor is implemented to adjust lengthwise positions of the pivot arm fulcrums and thus tune the oscillatory motion to different mechanical resonant frequencies. A convergence motor is also included to adjust controlled pivotal motion of the optical element, such that the optical element optical axis may be directed to difference convergence points. In accordance with yet another feature of the invention, a control system is included to selectively energize the three motors, such that adjustments of the disparity, convergence and tuning variables are properly coordinated to maintain high quality imaging.

It is to be understood that both the foregoing general description and the following detailed description are exemplarily and explanatory and are intended to provide further explanation of the invention as claimed.

The accompanying drawings are included to provide a further understanding of the invention and are incorporated in and constitute part of this specification, illustrate an embodiment of the invention and together with the description served to explain the principles of the invention.

BRIEF DESCRIPTION OF THE DRAWINGS

FIGS. 12 and 13 are signal waveforms utilized by the control system of FIG. 10 to control the autostereoscopic imaging apparatus of FIG. 1.

The corresponding reference numerals refer to like parts throughout the several views of the drawings.

DESCRIPTION OF THE PREFERRED EMBODIMENT

Figure 1:
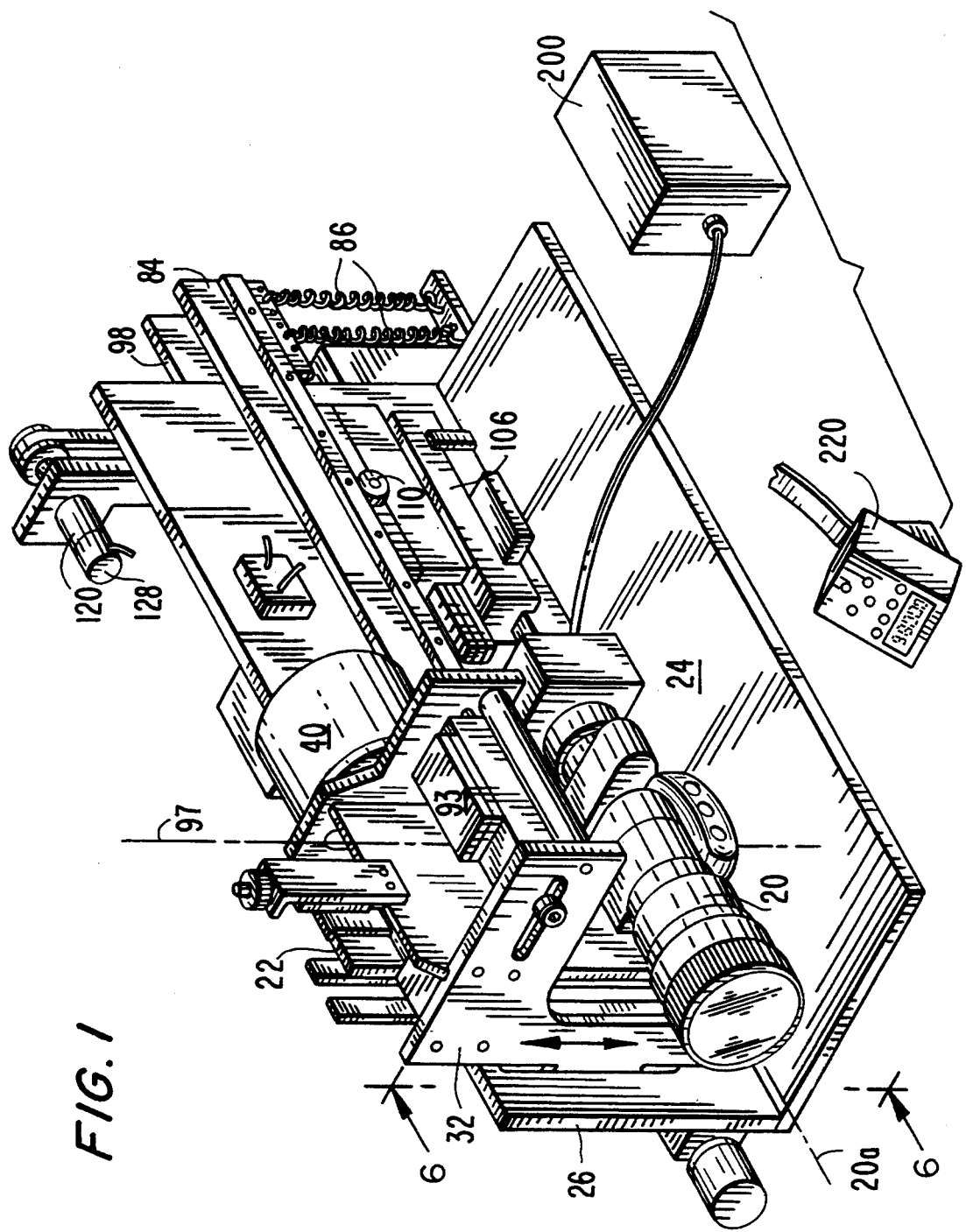
FIG. 1 is a perspective view of autostereoscopic imaging apparatus constructed in accordance with a preferred embodiment of the present invention.

The autostereoscopic imaging apparatus of the present invention functions to reciprocate an imaging device, such as a film camera or a video camera, in a vertical scanning motion while recording a succession of images of a scene, such that, on playback, a three-dimensional illusion of objects in the scene is displayed. As seen in FIG. 1, a video camera 20, such as a BVP-T7A CCD portable color camera manufactured by The Sony Corporation, is carried by a support assembly including a vertically oriented support frame 22, best seen in FIG. 4, which, in turn, is mounted for vertical oscillatory scanning motion by a stationary, L-shaped base consisting of a horizontal base plate 24 and an upright base plate 26. It will be understood that, rather these mounting the entire camera, the support frame can simply mount only an optical element or elements of the camera. Rails 28, affixed to opposed vertical sides of support frame 22, are formed with laterally protruding beveled edges which are engaged in V-shaped grooves of a set of at least four rollers 30 supported by mounts 31 affixed to upright base plate 26 (FIGS. 4 and 9) to smoothly guide the support frame 22 and camera 20 in vertical oscillation.

Figure 2:
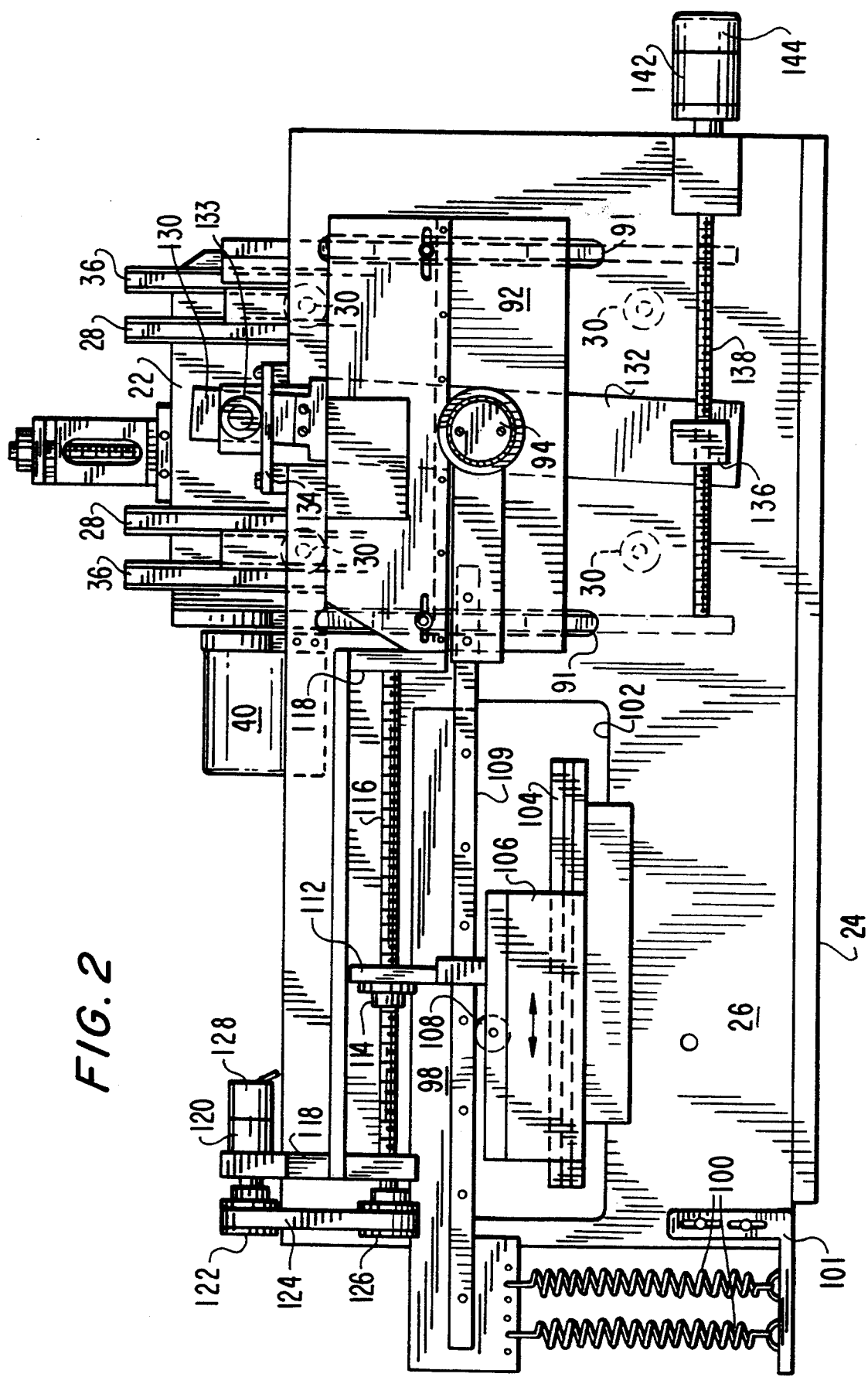
FIG. 2 is a left side elevational view of the autostereoscopic imaging apparatus of FIG. 1.
Figure 5:
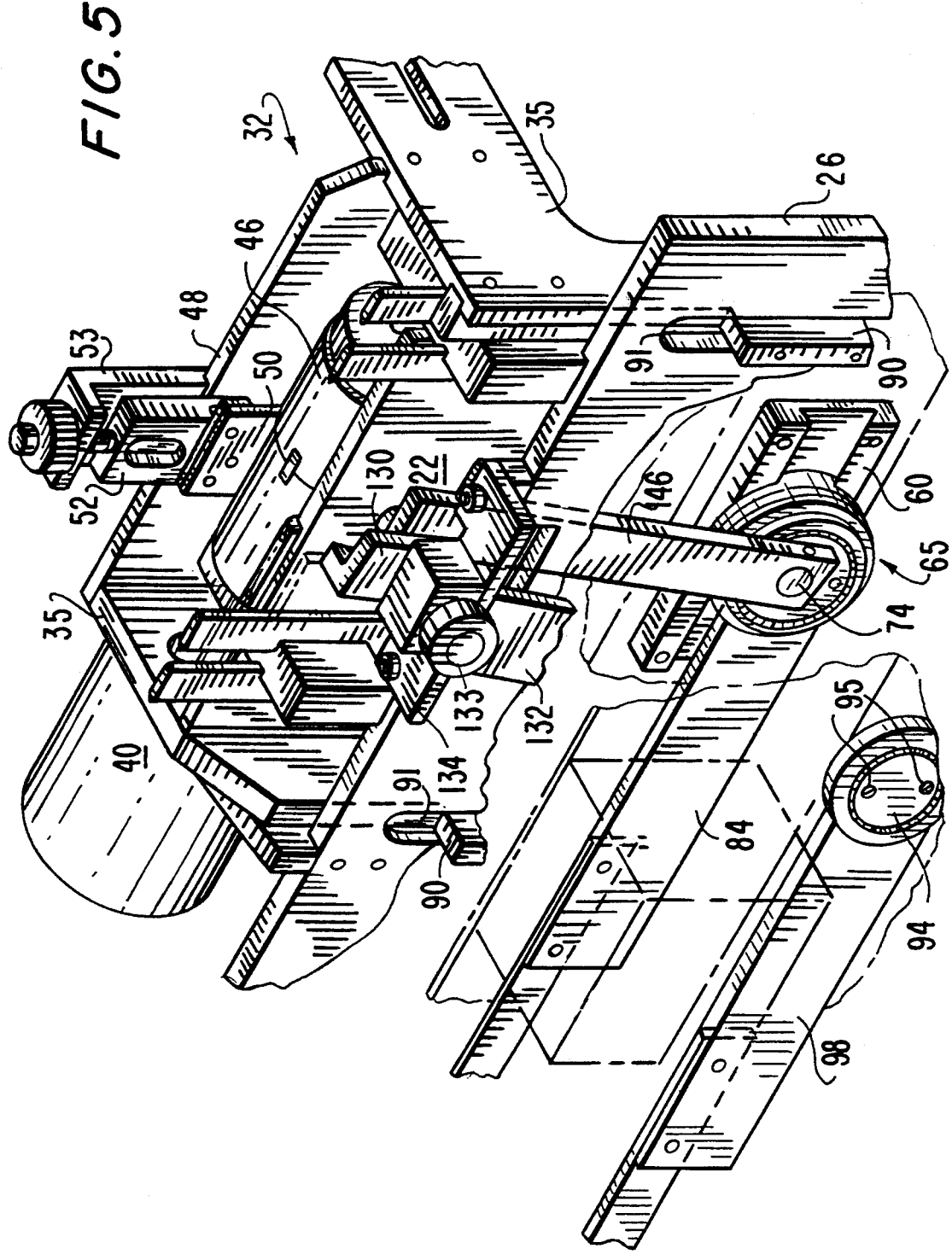
FIG. 5 is a fragmentary perspective view of a portion of the left side of the autostereoscopic imaging apparatus of FIG. 1.
Figure 9:
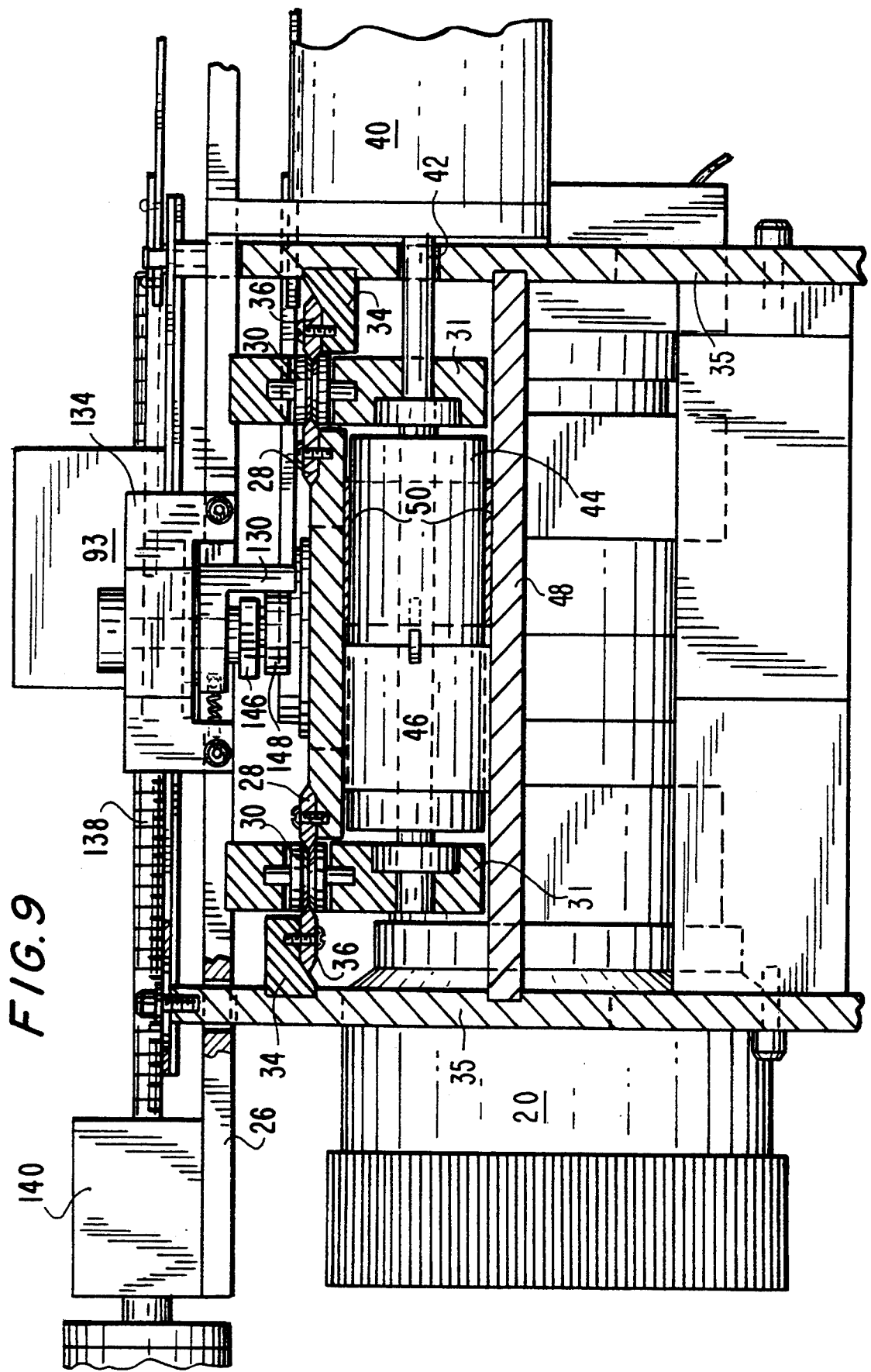
FIG. 9 is a sectional view taken along line 9—9 of FIG. 3.

As also seen in FIG. 1, to counterbalance the camera and support frame, the support assembly further includes a counterweight frame, generally indicated at 32, which is also mounted by upright base plate 26 for oscillatory vertical motion in 180° phased relation with the camera and support frame. This mounting is best illustrated in FIGS. 2, 5 and 9, wherein vertically elongated mounts 34, affixed to front and back plates 35 of counterweight frame 32, carry vertically oriented rails 36 in opposed relation with support frame rails 28, such that the beveled edges of rails 36 are also engaged in the V-shaped grooves of rollers 30. Since the counterweight frame 32 and the camera support frame 22 are always moving in opposite directions, the common engagements of rails 28 and 36 with rollers 30 are non-binding as the two frames vertically oscillate in 180° phased relation.

Figure 4:
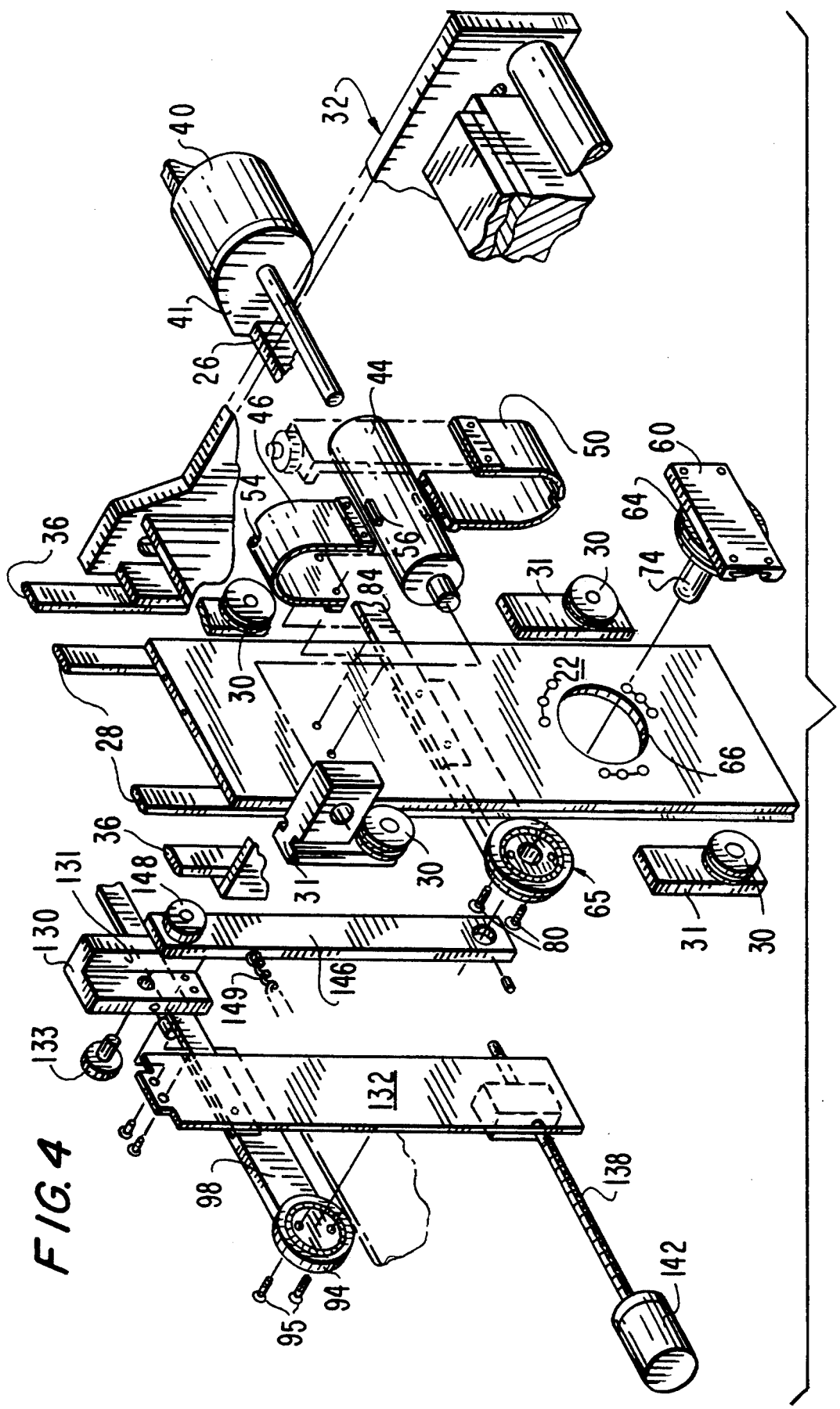
FIG. 4 is an exploded assembly view of a portion of the autostereoscopic imaging apparatus of FIG. 1.
Figure 8:
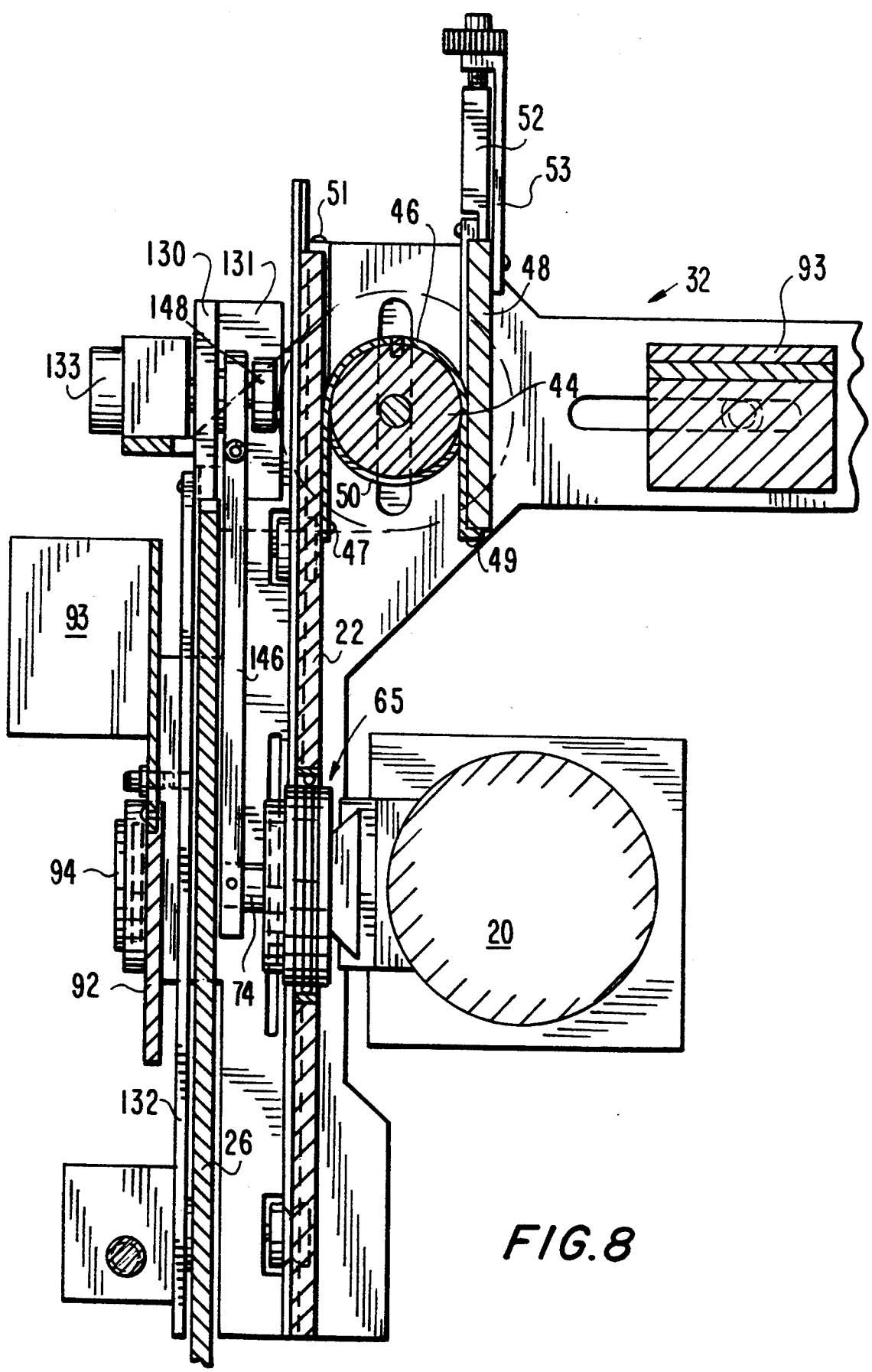
FIG. 8 is a sectional view taken along line 8—8 of FIG. 3.

To propel the oscillatory scanning motions of the counterweight and camera support frames, as well as to establish the extreme limits of this scanning motion path, a suitable motor 40, such as a brushless torque motor, is mounted to upright base plate 26 by a bracket 41 just rearwardly of counterweight frame back plate 35, as seen in FIGS. 4, 8 and 9. The elongated, horizontally oriented output shaft 42 of motor 40 passes through a vertically elongated slot 43 in back plate 35 and is journaled fore and aft by mounts 31. The motor shaft drivingly engages a drum 44 located between mounts 31. A first belt 46 is wrapped about the upper half of drum 44 with one end affixed to camera support frame 22, as indicated at 47 in FIG. 8, and its other end affixed to a cross member 48 of counterweight frame 32, as indicated at 49. A second belt 50 is wrapped about the lower half of drum 44 with one end affixed to the camera support frame, as indicated at 51, and its other end affixed to a belt tensioner 52 secured to cross member 48 of counterweight frame 32 by a bracket 53.

Belt 46 is notched, as indicated at 54, to except a key 56 protruding from the top side of the drum surface to thus provide non-slip driving engagement of belt 46 with drum 44. Belt tensioner 52 is adjusted to ensure excellent frictional engagement of belt 50 with the drum surface. Thus, when drum 44 is rotated in the clockwise direction in FIG. 8, camera support frame 22 is pulled upwardly by belt 46 and counterweight frame 32 is pulled downwardly by belt 50. Then with rotation of the drum in the counterclockwise direction, the counterweight frame is pulled upwardly by belt 46, and camera support frame 22 is pulled downwardly by belt 50. Consequently, the two frames are forced to always move in opposite directions in locked 180° phased relation by the alternating clockwise and counterclockwise oscillating output drive of motor 40.

Figure 7:
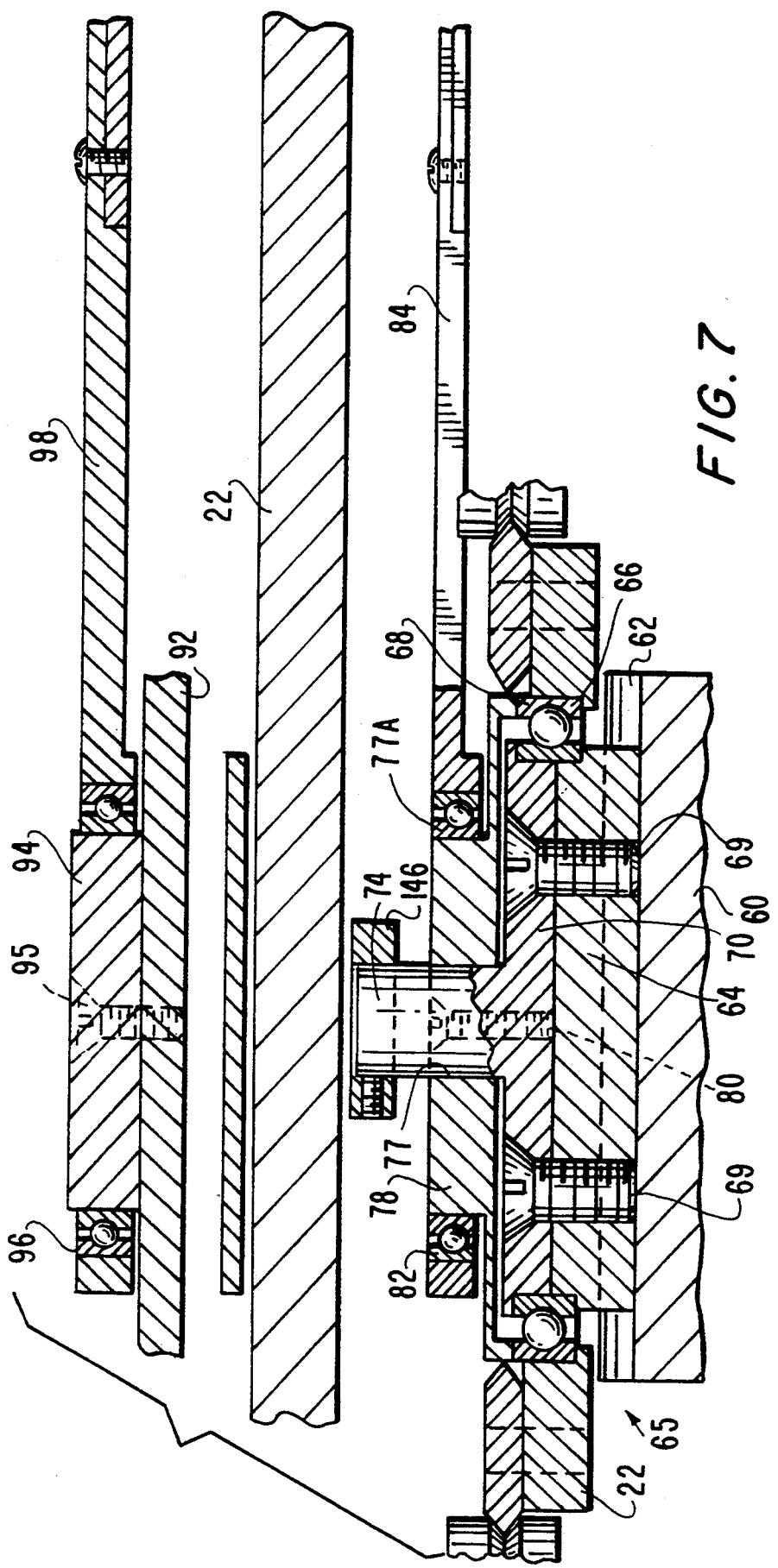
FIG. 7 is a sectional view taken along line 7—7 of FIG. 3.

As seen in FIGS. 4, 7 and 8, camera 20 is mounted to a bracket plate 60 joined by a dovetail joint 62 to a hub 64 of a pivot assembly, generally indicated at 65, which is journaled in an opening 66 in support frame 22 by a ring bearing 68. As best seen in FIG. 7, screws 69 clamp a bearing keeper plate 70 to hub 64. Plate 70 includes a stub shaft 74 which extends through a clearance opening 77 in a flange 78 secured to camera support frame 22 by screws 80 to cooperate with plate 70 in clamping ring bearing 68 in place. Flange 78 is formed with a hub portion 78A on which a ring bearing 82 is press-fitted.

Figure 3:
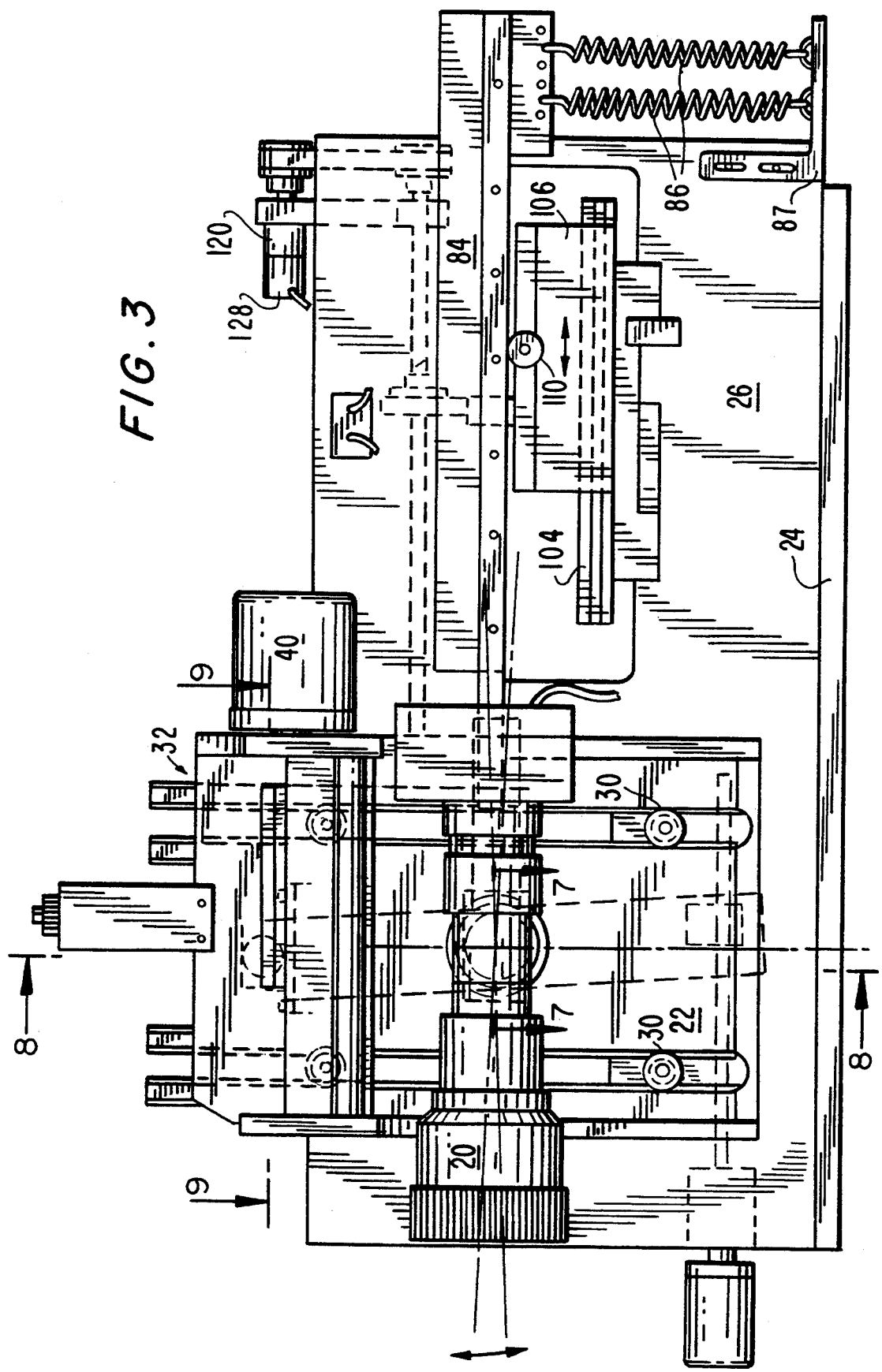
FIG. 3 is a right side elevational view of the autostereoscopic imaging apparatus of FIG. 1.

As seen in FIGS. 3, 4 and 7, the forward end of an elongated pivot arm 84 is formed with an aperture in which the outer race of bearing 82 is secured. This pivot arm is thus pivotally connected to camera support platform 22 via pivot assembly 65. The rearward end of pivot arm 84 is connected by springs 86 to a bracket 87 affixed to upright base plate 26.

Figure 6:
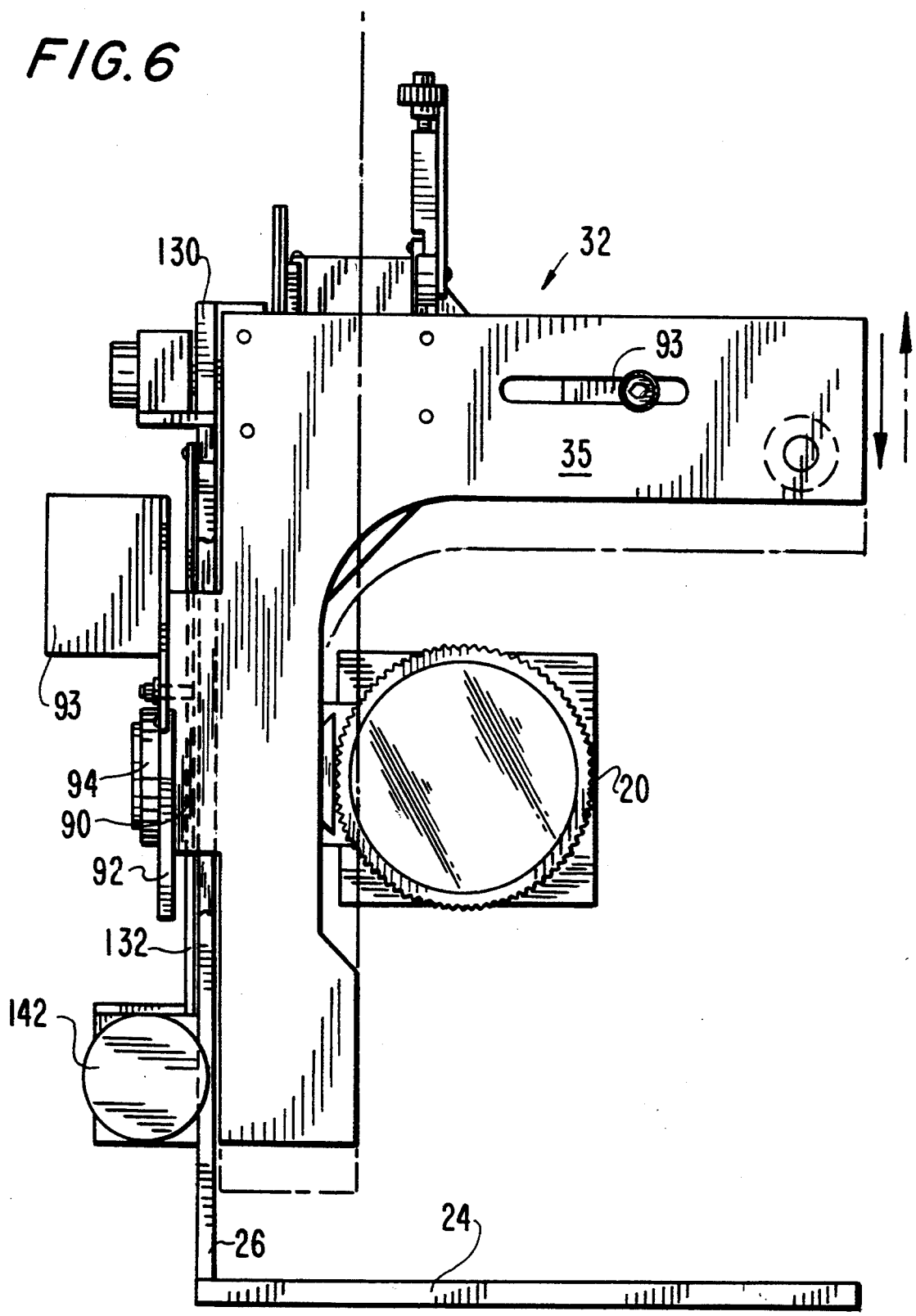
FIG. 6 is a front sectional view of the autostereoscopic imaging apparatus taken along line 6—6 of FIG. 1.

Turning to FIGS. 2, 5, and 6, front and back plates 35 of counterweight frame 32 are formed with tangs 90 which extend through vertically elongated slots 91 in upright base plate 26 to accommodate the vertical motion of the counterweight platform. A counterweight plate 92 is mounted to the terminations of these tangs in laterally spaced relation to upright base plate 26. If necessary, additional counterweights 93 may also be mounted to tangs 90. As seen in FIGS. 1 and 6, additional counterweights 93 are also mounted between the counterweight frame front and back plates 35 such that the mass of the counterweight frame is made precisely equal to the combined masses of camera 20 and its support frame 22. The lateral position of counterweights 93 is adjustable so as to permit alignment of the center of gravity of the counterweight frame with the center of gravity of the camera and support frame 22 along a vertical axis 97.

Returning to FIG. 7, a hub 94, secured to counterweight plate 92 by screws 95, receives a press-fitted ring bearing 96. The forward end of a second pivot arm 98 is provided with an aperture in which the outer race of ring bearing 96 is secured, thus to pivotally connect the second pivot arm forward end to counterweight frame 32. As seen in FIG. 2, the rearward end of pivot arm 98 is connected by springs 100 to a bracket 101 affixed to upright base plate 26. The vertical positions of spring bracket 87 for pivot arm 84 and spring bracket 101 for pivot arm 98 are separately adjustable to permit compensation for the manufacturing tolerances of springs 86 and 100 during setup, such as to achieve equalization of the spring forces acting on pivot arms 84 and 98 when their rearward ends are at precisely the same elevation.

Now referring to FIGS. 2 and 3, upright base plate 26 is formed with a rectangular opening 102 to provide a lower edge for mounting horizontal ways 104 which serve to mount and guide a carriage 106 in linear fore and aft motion. Rotatably mounted to the carriage are a pair of laterally aligned rollers, one roller 108 engaging the lower straight edge 109 of pivot arm 98, as seen in FIG. 2, and the other roller 110 engaging the lower straight edge 111 of pivot arm 84, as seen in FIG. 3. The rollers 108 and 110 thus serve as rolling fulcrums for pivot arms 98 and 84, respectfully, as the counterweight frame 32 and camera support frame undergo vertical oscillatory motion. The corresponding positions of the rollers along the lengths of the pivot arms establish effective spring constances for springs 100 and 86 and thus tune the oscillatory motion of the two frames to a particular resonant frequency. To accommodate adjustment of the resonant frequency of the oscillatory frame motion, a bracket 112 upstanding from carriage 106 carries a traveling nut 114 which threadedly engages a lead screw 116 journaled by brackets 118 affixed to upright base plate 26, as best seen in FIG. 2.

A motor 120, also mounted to the upright base plate, drives a pulley 122 which is drivingly coupled by a cog belt 124 to a pulley 126 affixed to the left end of lead screw 116. It is thus seen that selective energization of motor 120 drives carriage 106 either fore or aft to adjust the positions of rollers 108 and 110 along the lengths of pivot arms 98 and 84, respectively, and thereby tune the frame oscillatory motion to different resonant frequencies. A position encoder 128, driven off the output shaft of motor 120, provides tracking signals indicative of the laterally aligned positions of rollers 108 and 110 along the lengths of their respective pivot arms, which is indicative of the resonant frequency to which the mechanical resonator (counterweight frame 32 and the camera/support frame) is tuned.

While camera 20 undergoes vertical oscillation, it must also undergo concurrent pivotable motion about a horizontal axis such that the optical axis 20a (FIG. 1) of the camera is continuously directed at a single convergence point (not shown). To this end and as seen in FIGS. 2, 4 and 5, an L-shaped cam 130 is affixed to the upper end of a convergence adjust arm 132. This cam, in turn, is pivotally mounted by a pin 133 to a bracket 134 affixed to the upper edge of upright base plate 26. The lower end of the convergence adjust arm 132 pivotally mounts a traveling nut 136 threaded on a lead screw 138 which is cantilever mounted by a journal block 140 affixed to the upright base plate and driven by a motor 142. It is thus seen that the angular position of the convergent adjust arm and, correspondingly, the angular position of a flat cam surface 131 of cam 130 can be adjusted by selective energization of motor 142. A position encoder 144, incorporated in motor 142, generates tracking signals indicative of the angular position or slope of cam surface 134 set by the convergence adjust arm.

Turning to FIGS. 4, 5, 7 and 8, a convergence actuating arm 146 is pinned at its lower end to stub shaft 74 included in pivot assembly 65. The upper end of the convergence actuating arm carries a cam follower in the form of a roller 148 which is biased into rolling engagement with cam surface 131 by a spring 149. By virtue of this construction, as camera support frame 22 oscillates up and down, the engagement of cam follower roller 148 with cam surface 131 oscillates convergence actuating arm 146 in alternating clockwise and counterclockwise directions. As a result, camera 20 is oscillated about the horizontal axis of pivot assembly 65, such that the camera optical axis, originating at the imaging plane of the camera, is continuously directed at a single convergence point regardless of the camera position in its oscillation cycle.

From the foregoing description, it is seen that, with the mass of counterweight frame 32 being equal to the combined masses of the support frame 22 and camera 20 and with the centers of gravity of the counterweight frame and camera/support frame vertically align, vertical oscillatory motion of the camera is consistently smooth and vibration free. As should be understood by those skilled in the art, if, during oscillatory motion of the camera, images of the scene viewed by the camera are recorded at a time displacement rate of typically 3 to 6 Hz, which corresponds with the viseo-psychological memory rate of the human brain, a display of these images at the same time displacement rate during the parallax scanning motion of the camera presents images of differing parallax to the eyes of a viewer that coincides with the persistence of the visual memory of the human brain. As a result, depth information is presented to the viewer in a form that is naturally translated into three-dimensional images by the brain.

To achieve a high quality image display that will be perceived by a viewer in three-dimensional illusion, three variables must be adjusted in a coordinated manner, which, in the context of the present invention, are 1) disparity, the extreme limits of the parallax scanning motion or oscillation of camera 20, 2) frequency of the camera scanning motion, and 3) convergence to account for variations in the range between the camera and objects in the scene to be recorded.

Figure 10:
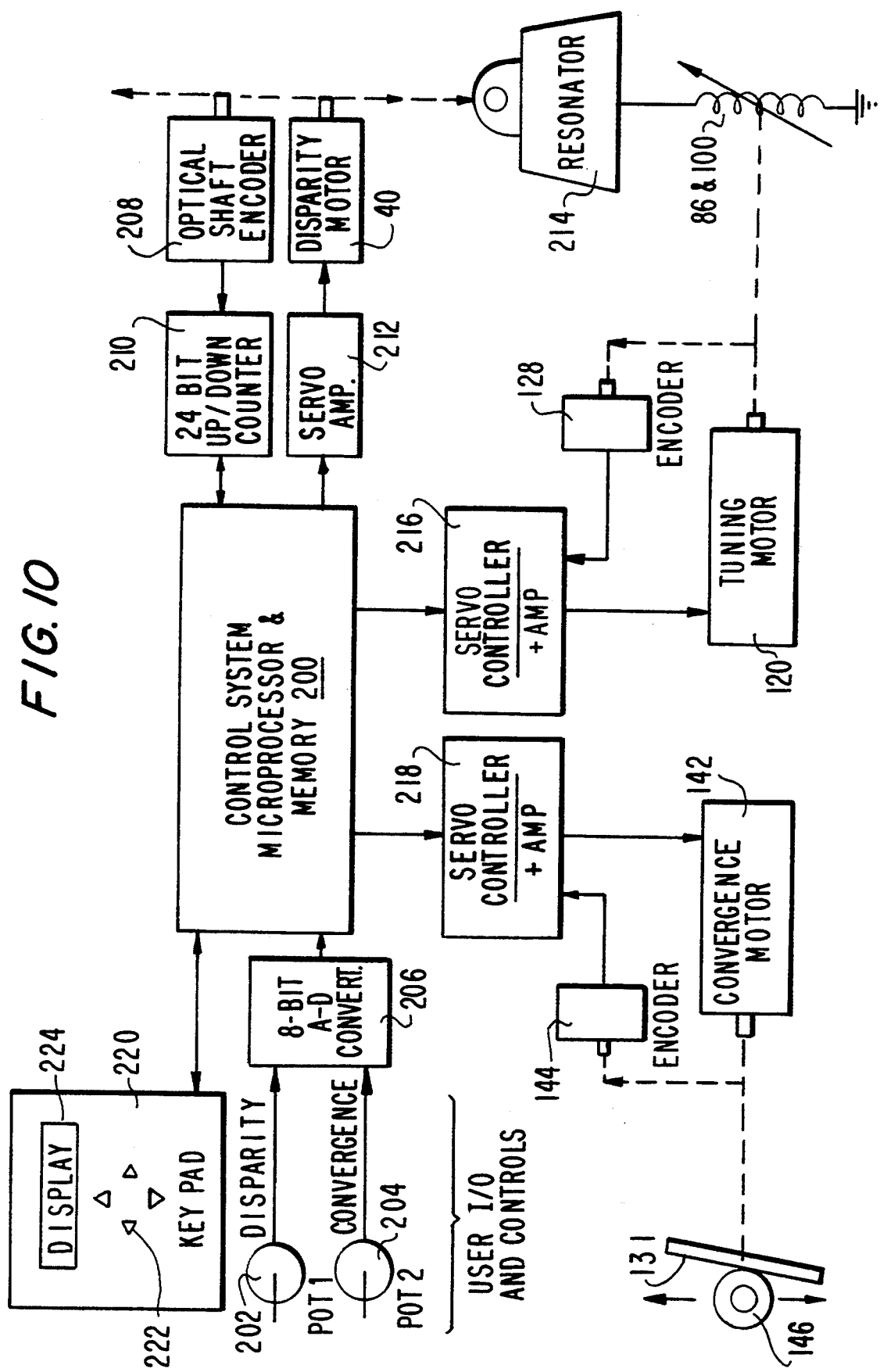
FIG. 10 is a block diagram of a control system utilized in the autostereoscopic imaging apparatus of FIG. 1.

To control the disparity, convergence and frequency variables in coordinated fashion, a control system, as seen in FIG. 10, is included in the autostereoscopic imaging apparatus of the present invention. This control system includes a microprocessor and associated memory 200 which receives manually initiated disparity analog control signals, via a potentiometer 202, and convergence analog control signals, via potentiometer 204. These analog control signals are converted to digital control signals by an 8-bit A-D convertor 206. The microprocessor 200 is also connected through a 24 bit up/down counter 210 to an optical shaft encoder 208 integrated in disparity motor 40 driving drum 44. The microprocessor also generates drive signals to a servo amplifier 212 connected to control the drive of the disparity motor 40, which is schematically illustrated, together with encoder 208, as being drivingly connected to oscillate the camera/support frame and counterweight frame, commonly illustrated in FIG. 10 by mechanical resonator 214. Position signals from encoder 208 enable the microprocessor to track the oscillatory motion of the resonator.

The microprocessor 200 also controls a pair of servo controller and amplifier circuits 216 and 218. The servo amplifier portion of circuit 216 is connected to drive tuning motor 120, and thus adjust the position of the roller fulcrums 108 and 110 along the lengths of pivot arms 98 and 84, respectively. As noted above these adjustments vary the resonant frequency of the parallax scanning oscillation of camera 20 by changing the effective spring constances of springs 86 and 100. The servo controller portion of circuit 216 receives input signals from the tuning motor shaft encoder 128, which indicate the position of the fulcrum rollers along the lengths of their respective pivot arms. To tune the resonator to a new frequency, the microprocessor sends positioning signals to the servo controller portion of circuit 216 indicating a new fulcrum roller position corresponding to the new frequency. These positioning signals are compared with the fulcrum roller position signals generated by encoder 128, and different signals are applied by the servo amplifier portion of circuit 216 to energize tuning motor 120 in the proper direction until the error signal is nulled when the fulcrum rollers achieve the new tuning position called for by the microprocessor positioning signals.

Similarly, the servo amplifier portion of circuit 218 selectively drives convergence motor 142 to adjust the slope or angular position of cam surface 131 engaged by cam follower roller 148. This adjustment, as noted above, changes the position of the convergence point in the scene being imaged, which the optical axis of camera 20 continuously intersects during camera oscillation. The slope of cam surface 131 and thus the convergence point position is continuously read out to the servo controller portion of circuit 218 by position encoder 144 integrated with the convergence motor. To change the convergence point position, the microprocessor outputs positioning signals to the servo controller portion of circuit 218 for comparison with the actual position of the convergence point in terms of the angular position of cam surface 131, as indicated by the position signals received from encoder 144. The difference between these two position signals is applied as an error signal to the convergence motor through the servo amplifier portion of circuit 218. The convergence motor is thus driven in the proper direction to null out any error signal in circuit 218, at which time a convergence point setting is established.

Also connected to microprocessor 200 is a terminal 220 which includes a key pad 222 and a display 224. Depression of appropriate keys of the key pad provides readouts on display 224 of the current disparity setting in terms of distance between the extremes of the parallax scanning motion of the camera, convergence in terms of the convergence point range, and the frequency of camera oscillation. Depression of other keys of the keyboard are effective to increase or decrease any selected one of these three variables.

Figure 11:
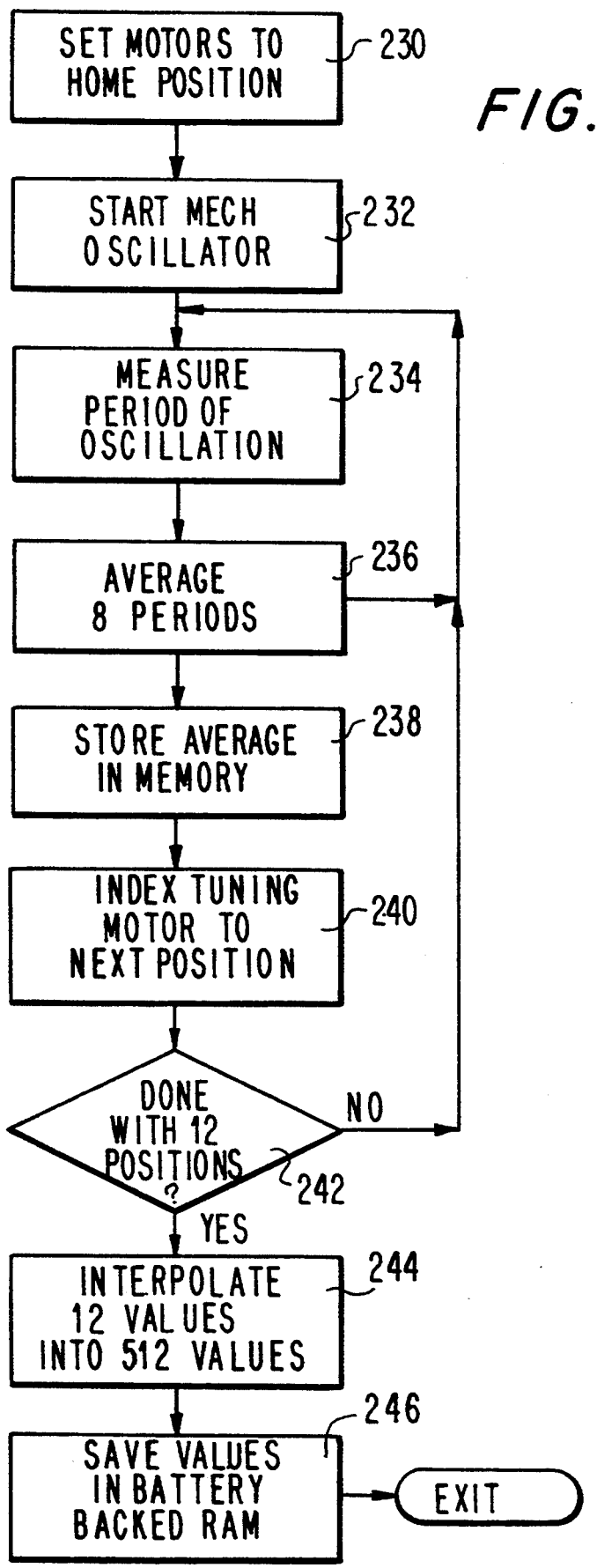
FIG. 11 is a flow diagram illustrating the operation of the control system of FIG. 10 in a calibration mode.

During setup of the autostereoscopic imaging apparatus, microprocessor 200 executes a calibration routine, which is illustrated in the flow chart of FIG. 11. As indicated in step 230, tuning motor 120 is set to a home position at one limit of an anticipated range of fulcrum roller positions that may be assumed during an imaging session. Disparity motor 40 is energized in step 232 to initiate oscillation of resonator 214. From readouts obtained from the disparity motor encoder 208, the period of oscillation of the resonator is measured (step 234), averaged over 8 periods (step 236) and the averaged oscillation period is stored in the microprocessor memory together with data identifying the corresponding position of the fulcrum rollers (step 238).

Tuning motor 120 is energized to index the fulcrum rollers to a next position in step 240, and steps 234, 236 and 238 are repeated for this next position. Once resonator periods for a suitable number, e.g., twelve, of positions, uniformly distributed throughout the anticipated range of fulcrum roller positions, have been measured, averaged and stored, as determined by step 242, the microprocessor, in step 244, interpolates the stored average oscillation period values into a large number, e.g., 512, of oscillation period values to fill in the gaps between the fulcrum roller positions for which oscillation period measurements were taken. The interpolated values are then stored in memory, together with corresponding fulcrum roller position data (step 246). From this database, the microprocessor can generate a synthetic sine wave equal in frequency to the particular mechanical resonant frequency to which the resonator is tuned for every fulcrum roller position within the anticipated range of positions.

During imaging operation of the autostereoscopic apparatus of the present invention, microprocessor 200, using the period database stored in its associated memory, generates a synthetic resonator velocity sine wave at the frequency to which the mechanical resonator 214 is tuned by the current fulcrum roller position. This velocity sine wave, indicated at 250 in FIG. 12, is scaled to a nominal velocity set point corresponding to its illustrated peak-to-peak amplitude and then compared with a sine wave 252 generated from the resonator position signals produced by disparity motor encoder 208 (FIG. 10) to represent actual resonator velocity. The difference or error signal is multiplied by a gain factor and applied to servo amplifier 212 which then energizes disparity motor 40 to appropriately drive drum 44 such as to replenish the energy stored in the resonator that has been lost due to friction. Preferably, comparison and energy replenishment is preformed a plurality of times, e.g., 32 times, distributed over each period, and serves as a course servo control of the resonator oscillatory motion.

Sine wave 254 in FIG. 13 is a plot of resonator position verses time developed by the microprocessor from the disparity encoder 208 output signals. Comparing FIGS. 12 and 13, it is seen that the positive and negative peaks of sine wave 254, which correspond to the upper and lower limits of resonator motion, are aligned in time with the points of zero velocity on sine waves 250 and 252. The peak-to-peak amplitude of sine wave 254 thus represents the disparity value the resonator is currently operating at.

Since disparity or parallax is the variable of primary concern during imaging, the peaks of sine wave 254 are continuously compared against positive 256 and negative 258 threshold levels, which are separated by a command set point amplitude which equals the disparity setting entered in microprocessor either by key pad 222 or potentiometer 202 (FIG. 10). The microprocessor compares the peaks of sine wave 254 with the thresholds 256 and 258, and integrates any error value over a number of periods. The integrated error value is summed by the microprocessor with the ratio of the disparity setting multiplied by appropriate scale factors and the period of the resonator frequency to calculate a new velocity set point. The microprocessor then adjusts the amplitude of sine wave 250 to the new velocity set point amplitude. The ongoing comparisons of sine waves 250 and 252 continue to produce error signals which are used by servo amplifier 212 as a fine servo control to energize disparity motor 40 such as to repeatedly adjust the amplitude of the resonator motion into conformity with the command set point (disparity setting).

During an imaging session, if frequency is changed by tuning motor 120, as may be desirable to enhance the quality of image display and improve three-dimensional illusion, the microprocessor generates appropriate sine wave 250 scaled to a nominal velocity set point for each new resonant frequency setting. The peaks of resonator amplitude sine wave 254 are repeatedly compared with the command set point (disparity setting) to calculate successive new velocity set points, and the microprocessor adjusts the amplitude of sine wave 250 to each of the new velocity set points. The error signals resulting from the comparisons of sine waves 250 and 252 are used to drive the disparity motor such as to bring the amplitude of sine wave 254 into conformity with the command set point. This process continues in servo control loop fashion to force the resonator oscillation amplitude into conformity with the command set point when the resonator frequency is changed, as well as to replenish the energy stored in the resonator that is dissipated due to mechanical losses. Disparity changes are accommodated without necessarily changing frequency. The servo control loop simply produces controlled energizations of the disparity motor to bring the amplitude of sine wave 254 into conformity with the new command set point. Changes in convergence do not affect prevailing disparity or frequency settings. Convergence settings are changed manually or automatically to account for different convergence point positions relative to the camera.

From the foregoing description, it is seen that the present invention provides a single camera autostereoscopic imaging apparatus that requires minimal energy to operate. By incorporating the camera in a mechanical resonator, energy is consumed only to make up mechanical losses and to accommodate changes in disparity, frequency and convergence settings. The apparatus is thus efficient in operation, conductive to easy manual control, robust in construction, and reliable over a long service life. Moreover, it will be appreciated that the imaging apparatus of the invention may be oriented such that oscillations of the camera/support frame and counterweight frame are in horizontal directions or have complements of motion in both the horizontal and vertical directions. Obviously, such orientations occur during an imaging session when the apparatus is carried by a moving vehicle, such as an airplane.

It will be apparent to those skilled in the art that various modifications and variations may be made in the autostereoscopic imagining apparatus of the present invention without departing from the spirit or scope of the invention. Thus, it is intended that the present invention cover modifications and variations thereof provided they come within the scope of the appended claims and their equivalents.

What is claimed is:

1. An optical element support assembly, comprising
   a. a base;
   b. a support frame to which an optical element may be mounted, said support frame movably coupled with respect to said base;
   c. a counterweight frame movably coupled with respect to said base;
   d. a motor coupled to oscillate said support frame and counterweight frame in opposite directions approximately 180° apart; and
   e. an elastic linkage, acting between said support frame and said counterweight frame and having an adjustment which alters the resonant frequency of said support assembly during operation of the support assembly.

2. An assembly of claim 1 wherein:
   said support frame comprises a first part supported on said base and a second part pivotably mounted on said first part, said second part having a surface onto which said optical element may be mounted.

3. An assembly of claim 2, wherein:
   said second part includes an actuating arm extending from where said second part pivots and a roller mounted on said actuating arm, and wherein said support frame further comprises a bar pivotably mounted to said base and positioned to engage said roller to allow adjustable convergence of said optical element by pivoting of said actuating arm as said support frame is oscillated relative to said base.

4. An assembly of claim 2, wherein:
   said elastic linkage includes first and second springs, an adjustable fulcrum slidably supported on said base, first and second pivot arms positioned to pivot about said fulcrum and each said pivot arm having one end biased toward said base by said first and second springs, respectively, the opposite end of said first arm rotatably connected to said counterweight frame and the opposite end of said second arm rotatably connected to said first part of said support frame.

5. An assembly of claim 3, further including:

a linkage between said motor and said support frame and counterweight frame comprising a drum driven by said motor and mounted to said base between a portion of said first part of said support frame and a portion of said counterweight frame, and at least one belt connected between said portions and positioned around said drum to force said support frame and counterweight frame to move in opposite directions upon rotation of said drum.

6. An assembly of claim 4, further including:

a linkage between said motor and said support frame and counterweight frame comprising a drum driven by said motor and mounted to said base between a portion of said first part of said support frame and a portion of said counterweight frame, and at least one belt connected between said portions and positioned around said drum to force said support frame and counterweight frame to move in opposite directions upon rotation of said drum.

7. An assembly of claim 1, wherein:

the center of gravity of said support frame and optical element and the center of gravity of said counterweight frame are axially aligned vertically, and a mass of said counterweight frame is equal to a combined mass of the optical element and said support frame.

8. An assembly of claim 1, further comprising a set of rollers mounted by said base, said rollers engaging said support frame and said counterweight frame to guide oscillatory motions of said support frame and counterweight frame in opposite directions.

9. An assembly of claims 1, wherein:

said support frame includes a pair of first rails, and said base includes a set of rollers engaging said first rails to guide oscillatory motion of said support frame.

10. An assembly of claim 9, wherein:

said counterweight frame includes a pair of second rails, said first and second rails engaging diametrically opposed peripheral portions of said rollers to guide oscillatory motions of said counterweight frame and said support frame in opposite directions.

11. An assembly of claim 4, wherein:

said first and second pivot arms are of equal length and said fulcrum engages said first and second pivot arms at corresponding pivot points.

12. An assembly of claim 11, wherein said fulcrum includes at least one roller engaging lower straight edges of said first and second pivot arms at corresponding lengthwise positions of said first and second pivot arms.

13. An optical element support assembly, comprising:
a. a base;
b. a support frame to which an optical element may be mounted, said support frame coupled to move with respect to said base;
c. a counterweight frame coupled to move with respect to said base;
d. a first motor coupled to oscillate said support frame and counterweight frame in opposite directions approximately 180° apart;
e. a first position encoder coupled to said first motor;
f. an adjustable spring assembly coupled between said support frame and said counterweight frame and including a second motor, whereby adjustment of said spring assembly by operation of said second motor alters the resonant frequency of said support assembly;
g. a second position encoder coupled to said second motor; and
h. a control system which provides control signals to said first and second motors as a function of input signals from said first and second position encoders.

14. An assembly of claim 13, wherein:

said control system includes a memory and a processor conditioned to act as a first logic circuit which sequentially drives said second motor to a sequence of positions, measures the period of resonant oscillation of said support assembly for each of said positions and stores data indicative of said measurements in said memory.

15. An assembly of claim 14, wherein:

said control system includes a variable control which converts user positioning of said variable control indicative of a desired frequency of operation into a first control signal and said processor further conditioned to act as a second logic circuit which converts the output of said first encoder into a second control signal indicative of actual movement of said assembly and which compares said first and second control signals and produces an output signal in response thereto for instantaneous control of said first motor.

16. An assembly of control 15, wherein:

said processor is further conditioned to act as a third logic circuit which, in response to said first control signal, selects from said memory data indicative of a position of said second motor and which, in response to said data, operates said second motor to obtain said position.

17. An assembly of claim 13, wherein:

said control system includes a processor conditioned to synthetically generate a first velocity sine wave representing a velocity of oscillatory motion of said support frame at a particular resonant frequency established by said second motor, to compare said first velocity sine wave to a second velocity sine wave derived from signals received from said first position encoder and to produce a first error signal, and to control energization of said first motor based on said first error signal to adjust an oscillation amplitude of said support frame.

18. An apparatus of claim 17, wherein:

said processor is further conditioned to compare a third sine wave derived from signals received from said first position encoder representing an existing oscillation amplitude of said support assembly to a command set point amplitude value, thereby producing a difference signal, and said processor deriving a velocity set point value from the difference signal and adjusting an amplitude of the first sine wave to a velocity set point.

19. An apparatus of claim 18, wherein:

said processor is further conditioned to energize said second motor to a succession of positions to tune said support assembly to a corresponding succession of different resonant frequencies, to measure a period of support assembly oscillations established at each said second motor position, and to store each measured period in a memory in correlation with a corresponding second motor position, whereby to provide a database enabling said processor to generate the first velocity sine wave corresponding to the position of said second motor indicated by signals from said second encoder.

20. An apparatus of claim 19, wherein:
said control system includes a first control circuit connected to compare a command set point amplitude value entered by a user with signals from said first encoder to produce the first error signal, said first control circuit controlling energization of said first motor in accordance with said error signal to adjust the amplitude of said support frame oscillations into conformity with the entered command set point amplitude value.

21. An apparatus of claim 20, wherein:
said control system further includes a second control circuit connected to compare second motor positioning signals corresponding to a desired resonant frequency with the signals from said second encoder to produce a second error signal, said second control circuit controlling energization of said second motor in accordance with said second error signal to establish the desired resonant frequency oscillation of said support assembly.

22. An apparatus of claim 21, further comprising:
a third motor; and
a third position encoder;
said control system further includes a third control circuit connected to compare third motor positioning signals corresponding to a desired convergence point with signals from said third position encoder to produce a third error signal, said third control circuit controlling energization of the third motor to establish the desired convergence point to which an optical axis of the optical element is consistently directed during oscillation of said support assembly.

23. Autostereoscopic imaging apparatus comprising, combination:
a mechanical resonator including a counterweight frame and a support frame to which an optical element of a video imaging device may be mounted;
drive means for inducing oscillation of said resonator, whereby said support frame and said counterweight frame undergo oscillatory motions in opposite directions approximately 180° apart to produce a parallax scanning motion of the optical element;
a spring assembly acting between said support frame and said counterweight frame;
first means for adjusting an effective spring constant of said spring assembly; and
a control system selectively controlling said drive means to regulate an amplitude of the resonator oscillation to a desired parallax setting and for selectively controlling said first means to adjustably tune the resonator oscillation to a desired resonant frequency setting.

24. An autostereoscopic imaging apparatus of claim 23, further comprising:
a base mounting said counterweight frame for linear oscillatory motion;
said support frame including a first part mounted by said base for linear oscillatory motion and a second part rotatably mounted to said first part, said second part for mounting the optical element; and
second means for controlling rotary motion of said second part relative to said first part, hereby to consistently direct an optical axis of the optical element toward a convergence point during oscillatory motion of said support frame, said control system connected to said second means for adjusting the rotary motion of said second part according to position changes of the convergence point.

25. An autostereoscopic imaging apparatus of claim 24, wherein:
said control system includes a processor for controlling said drive means based on repetitive first comparisons between a first sine wave, representing the amplitude of resonator oscillation, and the desired disparity setting, and repetitive second comparisons between a second sine wave, representing a velocity of the resonator oscillation and a processor-generated third sine wave representing a velocity of resonator oscillation at the resonant frequency setting, said third sine wave being repetitively adjusted in amplitude based on said first comparisons.

26. A autostereoscopic method for recording images that can be displayed in three-dimensional illusion, said method including the steps of:
providing a mechanical resonator including a member for mounting at least an optical element of an imaging device for oscillatory parallax scanning motion having an amplitude representing disparity limits and a resonant frequency of the resonator;
inducing mechanical oscillations of the resonator;
defining desired disparity limits for the optical element scanning motion;
adjustably setting a resonant frequency of the resonator;
generating a first signal having an amplitude representing the current disparity limits of the optical element scanning motion;
repeatedly comparing the desired disparity limits to the first signal amplitude to produce a difference signal;
generating a second signal at the resonant frequency setting;
repeatedly adjusting the amplitude of the second signal based on the difference signal;
generating a third signal representing the current velocity of the optical element scanning motion;
repeatedly comparing the first and second signals to produce an error signal; and
repeatedly adjusting the amplitude of the oscillatory motion of the optical element to minimize the error signal, whereby to bring the oscillatory motion of the optical element into conformity with the desired disparity limits.

27. A method of claim 26, further including a calibration step including the substeps of:
establishing a succession of resonator resonant frequency settings distributed over a range of resonant frequencies;
inducing mechanical oscillation of the resonator at each of the succession of resonator resonant frequencies,
measuring the period of oscillation at each of the resonator resonant frequency settings;

storing the measured periods to create a database of resonator oscillations; and generating the second signal from the database.

28. A method of claim 27, wherein the calibration step further includes a substep of:

interpolating, from the measured periods, the periods of resonator oscillation at resonant frequencies intermediate the established resonant frequency settings; and storing the interpolated periods of resonator oscillations in the database together with the measured periods of resonator oscillations.

29. A method of claim 26, further including the step of adjustably setting a convergence point to which an optical axis of the optical element is consistently directed during oscillatory scanning motion of optical element.

* * * * *

UNITED STATES PATENT AND TRADEMARK OFFICE
CERTIFICATE OF CORRECTION

PATENT NO. : 5,444,479
DATED : August 22, 1995
INVENTOR(S) : Leo M. Fernekes et al.

It is certified that error appears in the above-identified patent and that said Letters Patent is hereby corrected as shown below:

Claim 15, column 12, line 33, "assembly" should read --support frame--.

Signed and Sealed this

Twenty-fourth Day of October, 1995

*Attest:*

BRUCE LEHMAN

*Attesting Officer*        *Commissioner of Patents and Trademarks*